United States Patent [19]
Becker et al.

[11] Patent Number: 5,275,541
[45] Date of Patent: Jan. 4, 1994

[54] FLUID-OPERATED VALVE FOR PUMPS AND THE LIKE

[75] Inventors: Erich Becker, Bad Krozingen; Heinz Riedlinger, Freiburg, both of Fed. Rep. of Germany

[73] Assignee: KNF Neuberger GmbH, Freibura-Munzlingen, Fed. Rep. of Germany

[21] Appl. No.: 2,742

[22] Filed: Jan. 11, 1993

[30] Foreign Application Priority Data

Jan. 15, 1992 [DE] Fed. Rep. of Germany ....... 4200838

[51] Int. Cl.$^5$ .......................... F04B 21/02; F04B 13/00
[52] U.S. Cl. ................................ 417/413 R; 417/564; 417/566; 417/571; 137/516.21; 137/516.23; 137/854; 137/860
[58] Field of Search ............... 417/559, 564, 566, 569, 417/571, 413; 137/516, 516.17, 516.19, 516.21, 516.23, 854, 860

[56] References Cited

U.S. PATENT DOCUMENTS

| 1,834,590 | 12/1931 | Holdsworth | 137/516.23 |
|---|---|---|---|
| 2,264,136 | 11/1941 | Karlberg . | |
| 2,407,792 | 9/1946 | McMillan | 417/566 |
| 2,613,870 | 10/1952 | Borgerd | 137/516.21 |
| 3,592,302 | 7/1971 | Allinquant | 137/854 |
| 3,662,541 | 5/1972 | Sawada et al. | 137/854 |
| 3,827,539 | 8/1974 | Fader et al. | 137/854 |
| 3,900,276 | 8/1975 | Dilworth | 417/566 |
| 4,172,696 | 10/1979 | Gyory | 417/564 |
| 4,635,849 | 1/1987 | Igashira et al. | 137/854 |
| 4,643,139 | 2/1987 | Hargreaves | 123/65 |
| 4,701,114 | 10/1987 | Andersen et al. | 417/564 |
| 4,936,327 | 6/1990 | Baumann . | |
| 4,981,421 | 1/1991 | Baumann . | |

FOREIGN PATENT DOCUMENTS

| 38906 | 11/1981 | European Pat. Off. | 137/854 |
|---|---|---|---|
| 9960337 | 6/1970 | Fed. Rep. of Germany . | |
| 4118652 | 8/1992 | Fed. Rep. of Germany | 417/569 |
| 627573 | 10/1927 | France . | |
| 1346409 | 11/1963 | France . | |
| 93448 | 2/1969 | France . | |
| 2418402 | 10/1979 | France | 417/566 |
| 121368 | 7/1983 | Japan | 137/854 |
| 38481 | 11/1911 | Switzerland . | |
| 551275 | 2/1943 | United Kingdom . | |
| 1555596 | 11/1979 | United Kingdom . | |

*Primary Examiner*—Richard A. Bertsch
*Assistant Examiner*—Roland G. McAndrews, Jr.
*Attorney, Agent, or Firm*—Darby & Darby

[57] ABSTRACT

A diaphragm pump has a first fluid-operated valve which opens when the diaphragm performs a suction stroke and a second fluid-operated valve which opens when the diaphragm performs a compression stroke. The volumetric efficiency of the pump is enhanced by constructing at least one of its valves in such a way that the central portion of a resilient disc-shaped valving element, whose marginal portion bears against a seat when the valve is closed, abuts a supporting surface having a diameter selected in dependency on the diameter of the valving element, the thickness of the valving element and the Shore hardness of the material of the valving element in such a way that the selected frequency of the diaphragm in actual use of the pump induces a resonant frequency of the valving element. This also contributes to a reduction of noise and renders it possible to reduce wear upon the valving element and the adjacent parts of the respective valve.

18 Claims, 3 Drawing Sheets

FLUID-OPERATED VALVE FOR PUMPS AND THE LIKE

BACKGROUND OF THE INVENTION

The invention relates to fluid flow machines in general, and more particularly to improvements in pneumatic or hydraulic pumps (or compressors) which employ one or more fluid-operated valves. The invention also relates to improvements in fluid-operated valves for use in hydraulic or pneumatic pumps, compressors and like machines.

French Pat. No. 627,573 to Ingersoll-Rand Company discloses a valve which can be used in an air compressor and employs a washer-like valving element normally overlying a seat to seal a series of passages for the flow of air. The flowing air can deform the valving element against the convex surface of a fixedly mounted stop. A very large central portion of the valving element is clamped between the stop and the median portion of the seat by a threaded bolt. Valves employing such valving elements can generate considerable noise and the movement of the marginal portion of the valving element against the convex surface of the stop takes up a relatively long interval of time. Therefore, the volumetric efficiency of such valves is not entirely satisfactory.

French Pat. No. 1,346,409 to Etablissements Blancher discloses a valve which can be utilized in the compressor of a refrigerator and is similar to the valve described in French Pat. No. 627,573. Thus, a washer-like valving element can be deformed by the conveyed fluid so that its marginal portion bears against a convex surface of a stop. The major central portion of the valving element is clamped between the stop and the median portion of the seat for the marginal portion of the valving element. The drawbacks of this valve are the same as those enumerated hereinbefore in connection with the compressor valve of French Pat. No. 627,573.

French patent of addition No. 93,448 to Etablissements A. Guiot discloses a fluid-operated valve with an axially movable washer-like valving element which is biased against its seat by a coil spring. The valving element is designed to undergo deformation at elevated temperatures so that it can be flexed away from the seat; however, the valving element is displaced in its entirety at lower temperature when its material can resist deformation by the conveyed fluid.

British Pat. No. 551,275 to The British Thomson-Houston Company, Limited et al. discloses a valve assembly which can be used for air and gas compressors and comprises a washer-like valving element deformable against the convex underside of a curved plate.

U.S. Pat. No. 2,264,136 to Karlberg discloses a compressor valve wherein the valving element is a thin flat metal disc. The valving element and its seat are replaceable.

Swiss Pat. No. 58,481 to Escher, Wyss & Cie. discloses a cylinder for use in pumps or compressors. A flexible disc-shaped valving element is employed to yield when a piston performs a forward stroke to permit a compressed fluid to escape from the cylinder chamber.

Published German patent application Ser. No. 1,960,337 of Lavon discloses a compressor valve. A relatively narrow marginal portion of a disc-shaped valving element can be flexed by flowing fluid to bear against a substantially frustoconical stop opposite a seat which is engaged by the marginal portion of the valving element when the valve is closed.

A drawback which is shared by all of the aforediscussed fluid flow machines and their fluid-operated valves is that the volumetric efficiency of the machine cannot be varied, especially improved, that the valves generate a substantial amount of noise and that the valving elements and/or other parts undergo extensive wear. Such problems are particularly acute in diaphragm pumps or other piston pumps which are used to convey gaseous or other fluids and are equipped with pairs of fluid-operated valves, one for admission of a fluid medium into the pumping chamber when the diaphragm or another piston is caused to perform a suction stroke and the other to permit discharge of fluid from the chamber when the diaphragm or another piston performs a compression stroke. The valving element of one of the valves moves away from its seat in response to the establishment of a pressure differential at its sides, and the same holds true for the valving element of the other valving element. The valving elements are installed in stressed condition so that they tend to move against their seats and to thus close the respective valves. An important advantage of the just described fluid flow machines with fluid-operated valves is that the valving elements are deformable and/or otherwise movable by the conveyed fluid. Thus, one can dispense with mechanical and/or other means for moving the valving elements between open and sealing positions. As a rule, a mechanism for moving a valving element must be lubricated and the lubricant is likely to come in contact with the conveyed fluid which may be detrimental to the fluid and/or to the lubricant. Moreover, the conveyed fluid is likely to attack the material of component parts of the mechanism which is used to move a valving element between open and sealing positions.

An additional drawback of presently known pumps, compressors and other fluid flow machines which employ fluidoperated valves is that their volumetric efficiency is not entirely satisfactory, especially if the piston (e.g., a diaphragm) is moved at a high frequency. The volumetric efficiency can be improved by satisfying two conflicting or non-compatible requirements, namely by ensuring longer opening times for the fluid-operated valve or valves and by ensure abrupt (short-lasting) movements of valving elements to their sealing positions.

OBJECTS OF THE INVENTION

An object of the invention is to provide a fluid flow machine, such as a diaphragm pump, with one or more novel and improved fluid-operated valves.

Another object of the invention is to provide a novel and improved valve for use in a fluid flow machine, such as a diaphragm pump.

A further object of the invention is to provide a machine which employs one or more fluid-operated valves and whose volumetric efficiency is more satisfactory than that of heretofore known machines.

An additional object of the invention is to provide a machine which employs one or more fluid-operated valves and whose operation results in the generation of less pronounced noise than that of heretofore known machines.

Still another object of the invention is to provide a novel and improved combination of a housing, such as a pump housing, and a fluid-operated valve.

A further object of the invention is to provide a simple and inexpensive fluid flow machine, such as a diaphragm pump, whose volumetric efficiency can be varied within a wide range in a time-saving manner.

Another object of the invention is to provide a versatile machine which employs one or more fluid-operated valves and can be used to convey gaseous or hydraulic fluids.

An additional object of the invention is to provide a fluid-operated valve which can be installed in existing pumps, compressors or analogous machines as a superior substitute for heretofore known fluid-operated valves.

Still another object of the invention is to provide a novel and improved fluid flow machine which embodied one or more fluid-operated valves and wherein the wear upon the component parts is less pronounced than in heretofore known fluid flow machines.

An addition object of the invention is to provide a fluid-operated valve which is subject to less pronounced wear and generates less noise than heretofore known fluid-operated valves even though it is neither more complex nor more expensive than heretofore known fluid-operated valves.

Still another object of the invention is to provide a novel and improved valving element for use in a fluid-operated valve of the above outlined character.

A further object of the invention is to provide a novel and improved support for use with the valving element of the above outlined fluid-operated valve.

SUMMARY OF THE INVENTION

The invention is embodied in a fluid flow machine (hereinafter called pump for short) which comprises a housing defining a pumping chamber, a piston (e.g., a diaphragm whose marginal portion is clamped between two portions of the housing) which is movable relative to the housing to alternatively perform first and second strokes at a selected frequency and to thereby respectively draw a fluid into and expel the fluid form the chamber, a fluid-operated firs valve which is carried by the housing and serves to admit fluid into the chamber whenever the piston performs a firs stroke, and a fluid-operated second valve which is carried by the housing and serves to discharge fluid from the chamber whenever the piston performs a second stroke. At least one of the valves comprises a substantially disc-shaped resilient valving element having a predetermined thickness, a predetermined diameter, a central portion and a marginal portion. The at least one valve further comprises a seat for the marginal portion at one side of the valving element and a support for the central portion at the other side of the valving element. The marginal portion is is moved away from the seat by the fluid when the piston performs one of its first and second stokes, and the at least one valve further comprises a compartment which surrounds the support and serves to receive the marginal portion of the valving element when the marginal portion moves away from the seat. The support has a substantially circular supporting surface which contacts the central portion of the valving element and has a radius such that the selected frequency of the piston induces a resonant frequency of the resilient valving element. The radius is a unction of at least one of a plurality of parameters including the diameter, the thickness and the resiliency of the valving element.

The support can comprise a base (such base an form part of the housing) and an exchangeable insert on the base. The substantially circular surface is then provided on the insert, and a first inset can be replaced by an insert with a surface having a different radius or by any one of a set of inserts each having a surface with a different radius. This enables the person in charge to influence the operation of the pump by influencing the extent an duration of opening of the at least one valve when the piston performs a first or a second stroke, depending upon whether the at least one valve is the first valve or the second valve. The insert can include a resilient disc whose marginal portion yields under the action of the valving element when the marginal portion of the valving element is acted upon by a fluid in a sense to move away from the seat and into the compartment.

The base of the support can be provided with a second substantially circular surface, and the radius of the second surface is preferably smaller (or can be smaller) than the radius of the substantially circular surface of the insert (i.e., of that surface which contacts the central portion of the valving element).

The resiliency or flexibility of the valving element can increase in a direction from the central portion toward the marginal portion of such element.

At least a portion of the substantially circular surface which contacts the central portion of the valving element can be flat.

At least a portion of the other side of the valving element can be flat, at least when the marginal portion of the valving element engages the seat. Such flat portion can be provided on the central portion of the valving element.

The support can be provided with an at least partially acruate surface which surrounds the substantially circular surface and bounds a portion of the compartment. Such arcuate surface is or can be at least partially convex and preferably merges gradually into the substantially circular surface. The arrangement may be such that the marginal portion of the valving element can be moved in the compartment into actual abutment with the arcuate surface when the at least one valve is fully open. The valving element is preferably flexible to lie at least substantially flush against the acruate surface in response to movement of the marginal portion of the valving element away from the seat.

The housing includes a portion which is adjacent the chamber, and at least one of the two valves can be installed in such portion of the housing. The at least one valve can be at least substantially identical with the other vale.

The novel features which are considered as characteristic of the invention are set forth in particular in the appended claims. The improved fluid-operated valve itself, however, both as to its construction and its mode of operation, together with additional features and advantages thereof, will be best understood upon perusal of the following detailed description of certain presently preferred specific embodiments with reference to the accompanying drawings.

DESCRIPTION OF THE PREFERRED EMBODIMENTS

Figure 1:
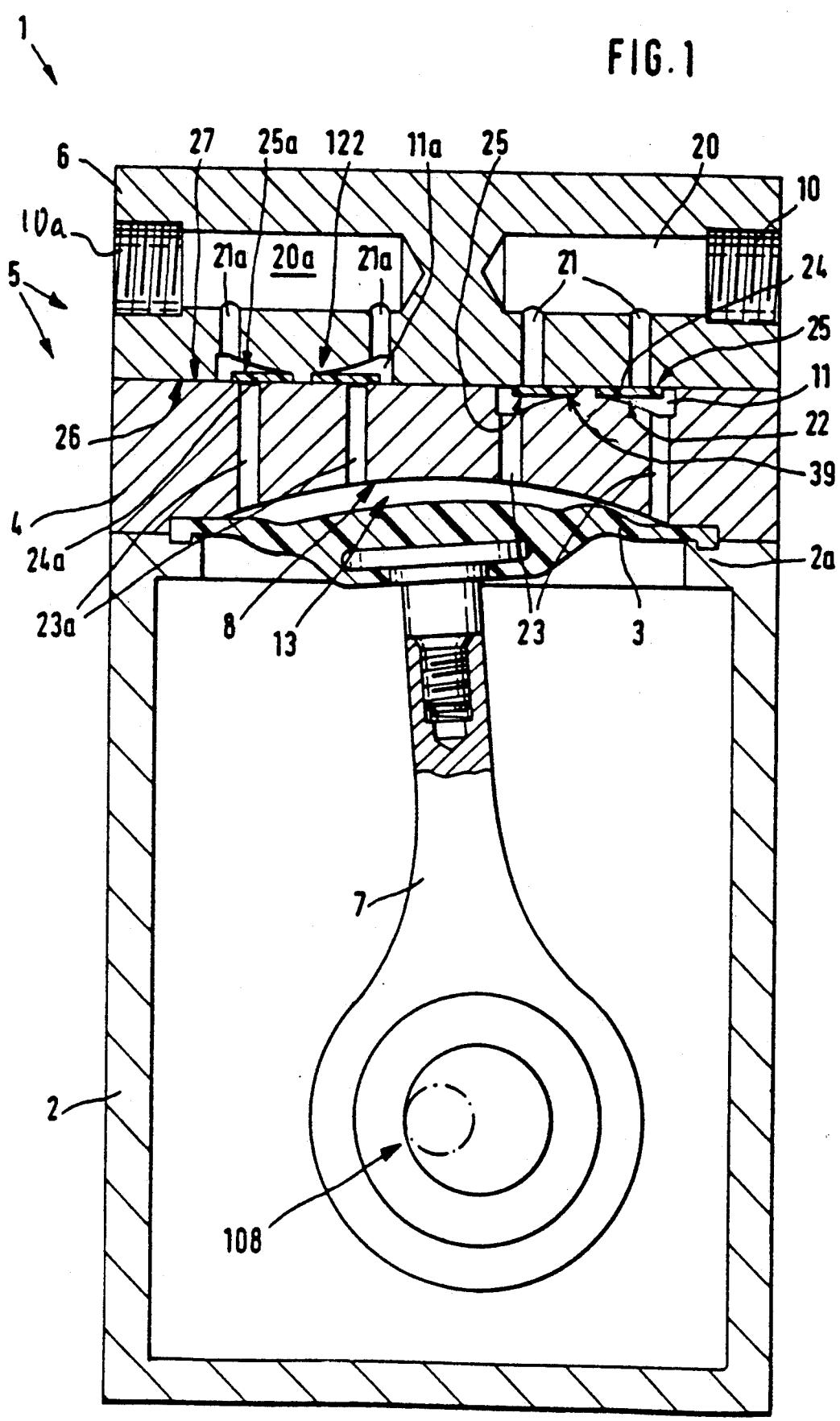
FIG. 1 is a partly elevational and partly sectional view of a diaphragm pump with two fluid-operated valves at least one of which is constructed in accordance with one embodiment of the present invention.

FIG. 1 shows a fluid pump 1 wherein the piston is a diaphragm 3 having a marginal portion which is sealingly clamped between a first portion 2 and a composite second portion 5 of a pump housing. The second portion 5 of the housing includes a first section 4 which is immediately adjacent the end 2a of the housing portion 2 and cooperates with the latter to sealingly engage and clamp the marginal portions of the diaphragm 3, and a second section 6 which is sealingly secured to the section 4. That side of the section 4 which faces the interior of the housing portion 2 is provided with a concave recess 8 forming part of a pumping chamber 13 defined by the section 4 jointly with the median (unclamped) portion of the diaphragm 3. The concave surface of the section 4 which bounds the recess 8 is or can be a portion of a spherical surface.

The section 6 of the composite housing portion 5 is provided with a blind bore or hole 20 which is tapped at 10 to take the externally threaded portion of a nipple or a like part serving to supply a fluid from a suitable source (not shown) for admission into the pumping chamber 13. The section 6 is further provided with channels 21 which extend substantially radially of the bore 20 and terminate at the adjacent side of a disc-shaped resilient valving element 24 forming part of a first valve 22. This valve is operated by the fluid which enters at 10 and is drawn into the chamber 13 when the median portion of the diaphragm 13 performs a first or suction stroke in a downward direction (as viewed in FIG. 1) in order to draw fluid into the chamber 13. When the marginal portion 34 (FIG. 2) of the valving element 24 is moved away from its seat 25, the fluid is drawn from the channels 21 into the chamber 13 through channels 23 provided in the section 4 of the composite portion 5 of the pump housing. The valve 22 further comprises a support for the central portion 39 of the valving element 24 and an annular compartment 11 which is adjacent the underside (as viewed in FIG. 1) of the major part of the valving element 24, namely of that part which surrounds the central portion 39 and extends all the way to the periphery of the valving element. The support for the central portion 39 of the valving element 24 is an integral part of the section 4 and is located between the channels 23. This support has a substantially circular plane surface 40 which abuts the adjacent side of the central portion 39 of the valving element 24.

When the pump 1 is not in use, i.e., when the median portion of the diaphragm 3 is not reciprocated by the adjacent end portion of a connecting rod 7, the valve 22 is closed because the marginal portion 34 of the valving element 24 then bears against the seat 25 which is part of the respective side 26 of the section 6, namely of that side of the section 6 which is in sealing engagement with the adjacent side 27 of the section 4. The means for reciprocating the median portion of the diaphragm 3 further comprises an eccentric drive 108 for the connecting rod 7. The exact details of mounting the marginal portion of the diaphragm 3 between the housing portions 2, 5 and/or the exact construction of the means for moving the median portion of the diaphragm 3 relative to the section 4 forms no part of the present invention. The invention is embodied primarily in the construction, mounting and mode of operation of the valve 22 and of a preferably identical or similar second valve 122 which is also operated by the fluid and serves to discharge fluid from the chamber 13 whenever the median portion of the diaphragm 3 performs a stroke toward the concave surface at the adjacent side of the section 4. The invention is also embodied in a fluid flow machine which employs one or more fluid-operated valves of the type shown at 22 and 122. The valving element 24a of the valve 122 is mounted between the sections 4, 6 but the marginal portion of the valving element 24a normally engages a seat 25a which is part of the surface 27 of the section 4. The marginal portion of the valving element 24a can yield by moving away from the seat 25a and into an annular compartment 11a which is provided in the surface 26 and surrounds a support for the central portion of the valving element 24a; such support is shown as an integral part of the section 6. The compartment 11a can communicate with the chamber 13 through channels 23a which are provided in the section 4, and the compartment 11a can communicate with a bore or hole 20a in the section 6 through channels 21a of the section 6 when the median portion of the diaphragm 3 moves into the recess 8 to expel pressurized fluid from the chamber 13 into the bore 20a. The latter is or can be connected to one or more consumers by way of an externally threaded nipple or a like part meshing with the thread in the tapped portion 10a of the bore 20a.

Figure 2:
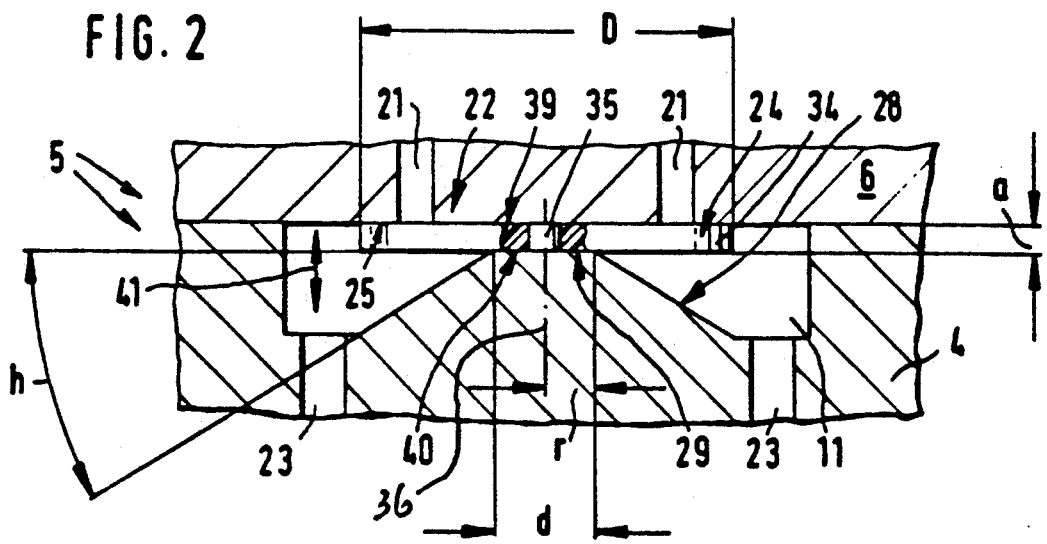
FIG. 2 is a greatly enlarged central sectional view of the right-hand fluid-operated valve in the pump of FIG. 1.

Since the second valve 122 is or can be identical with the valve 22, the following description will deal primarily with the construction and mode of operation of the valve 22. The center of the seat 25 for the marginal portion 34 is preferably located on an axis 36 (FIG. 2) which further includes the center of the supporting surface 40 and the center of the portion 39 of the valving element 24. As stated hereinbefore, and as shown in FIGS. 1 and 2, the support (namely that component which is provided with the surface 40) for the central portion 39 can form an integral part of (e.g., it can be of one piece with) the section 4 of the housing portion 5. The surface 40 is surrounded by a frustoconical surface 28 which flanks the adjacent portion of the annular compartment 11 serving to receive that part of the valving element 24 which extends radially outwardly beyond the surface 40 when the valve 22 is open and enables the median portion of the diaphragm 3 to draw fluid from a suitable source into the chamber 13 through the bore 20, channels 21, compartment 11 and channels 23.

In a conventional fluid-operated valve, the diameter of the valving element is normally determined by the distribution of channels (corresponding to the channels 21 or 23a) which can admit a fluid into a compartment (corresponding to the compartment 11 or 11a) when the respective valve is open. Furthermore, the movement of the valving element in a conventional fluid-operated valve is determined by the extent to which the valving element can be flexed into the compartment of such conventional valve, by the thickness of the valving element and by the speed of operation of the pump, i.e., by the frequency of alternating suction and expulsion strokes carried out by the median portion of a diaphragm if the conventional valve is installed in a diaphragm pump. It is also customary to consider another parameter, namely a characteristic (such as the Shore hardness) of the material of the valving element.

In accordance with a feature of the present invention, the radius r of the substantially circular supporting surface 40 for the central portion 39 of the disc-shaped resilient valving element 24 is selected in such a way that the selected frequency of operation of the median portion of the membrane 3 induces a resonant frequency of the valving element 24. To this end, the radius a is selected as a function of one or more parameters including the diameter D of the valving element 24, the thickness a of the valving element and the resiliency of the valving element. Such selection of the radius a (or of the diameter d of the supporting surface 40) enables the designer of the valve 22 to construct the valve in such a way that the intervals of dwell of the valving element 24 in open position are long and the marginal portion 34 of the valving element 24 rapidly reassumes its position of engagement with the seat 25. This enhances the volumetric efficiency of the pump 1 and is believed to be attributable to the following relationships:

The closing force is a function of the diameter d of the supporting surface 40, i.e., the closing force increases if the diameter d is increased provided that the other parameters (such as the diameter D of the valving element 24, the maximum angle h of movement of the marginal portion of the valving element toward the surface 28 in the annular compartment 11, the thickness a of the element 24, and the Shore hardness of the material of the element 24) remain unchanged.

Figure 5:
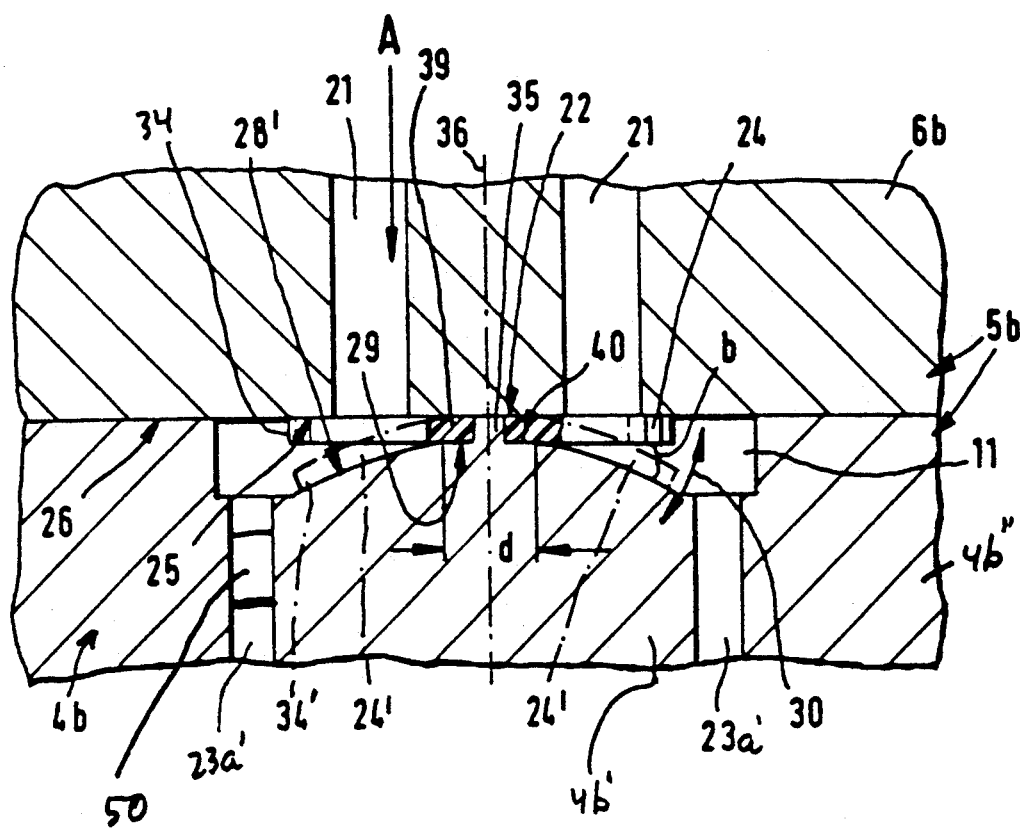
FIG. 5 is a similar sectional view of a valve which constitutes another modification of the valve shown in FIG. 2.

The channels 23 in the section 4 can form an annulus if equidistant channels with parallel axes which are located at the same distance from the axis 36, i.e., from the center of a circle concentric with the valving element 24 and supporting surface 40. One end of each such channel 23 communicates with the annular compartment 11 at the marginal portion 34 of the valving element 24, and the other end of each such channel communicates with the chamber 13. Analogously, the channels 23a in the section 4 can form a circle of parallel channels each having one end adjacent the marginal portion of the valving element 24a and another end communicating with the chamber 13. Alternatively, and as shown in FIG. 5, the individual channels 23 can be replaced with an annular channel 23a' which nearly fully separates a central part 4b' of the section 4b from a surrounding part 4b''. The parts 4b', 4b'' are connected to each other by an array of webs (one shown at 50) which extend across the channel 23a'. The same holds true for the channels 23a of FIG. 1, i.e., such channels can be replaced with a channel corresponding to the channel 23a' of FIG. 5. Moreover, and if the bore 20 and/or 20a is replaced with a differently configurated space for admission or evacuation of a fluid, the channels 21 or 21a can also form part of an annular array of channels or they can be replaced with annular channels corresponding to the channel 23a' of FIG. 5.

The double-headed arrow 41 denotes the directions of movement of marginal portion 34 of the valving element 24 toward and away from sealing engagement with the seat 25, and the character 29 denotes the surface at the underside of the central portion 39 of the valving element 24, i.e., that portion of the underside of the valving element (as viewed in FIG. 2) which is contacted by the circular supporting surface 40.

An important advantage of the improved pump 1 and of the fluid-operated valves 22, 122 is that the aforediscussed construction and mounting of the valves provide an additional disposition parameter for the mode of operation of the valves in the pump. The diameter D of a valving element (such as 24) is normally selected in dependency on the distribution of channels (such as 21) whose ends must be sealed when the respective valve is closed. The stroke of the valving element (namely the movement of the marginal portion (such as 34) from sealing engagement with its seat (25) to a position at a maximum distance from the seat or in the opposite direction) is determined by the frequency of reciprocation of the median portion of the diaphragm 3, by the volume of the fluid to be conveyed per unit of time and by the thickness a of the valving element. These parameters are dependent upon the construction of the pump, for example, upon the pressure of fluid which is being conveyed by the pump. This applies for certain constructional and operational ranges, and the thickness of the valving element is also dependent upon the quality (such as Shore hardness) of its material. The invention renders it possible to ensure, with the simple expedient of properly selecting the diameter d of the supporting surface 40, an optimizing of the extent of movement of the valving element to and the duration of dwell of the valving element in the open position as well as the velocity of movement of the valving element to its closed position. The improved valve can be embodied in a variety of pumps and analogous flow machines irrespective of whether the piston of the machine is a diaphragm or a plunger.

Figure 3:
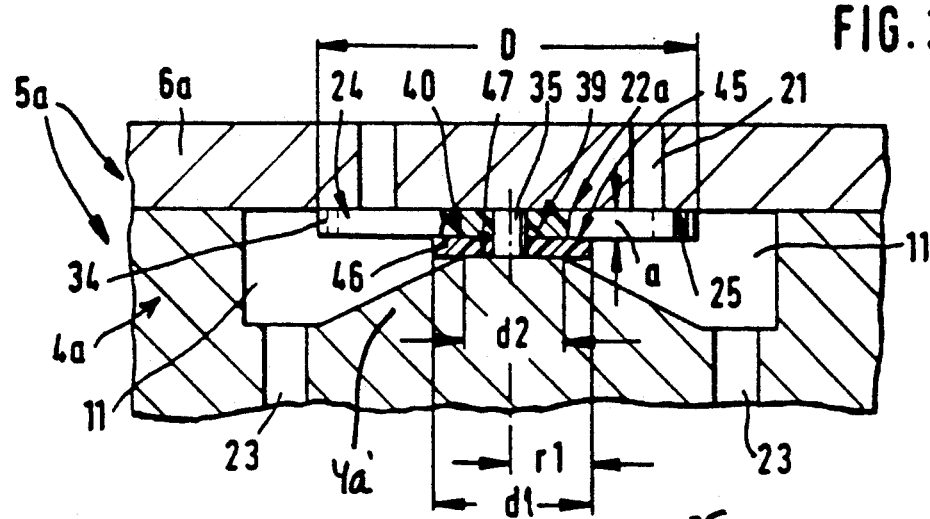
FIG. 3 is a similar sectional view of a fluid-operated valve constituting a first modification of the valve of FIG. 2.

As can be seen in FIG. 3, the support for the central portion 39 of a valving element 24 need not be of one piece. Thus, the support which is shown in FIG. 3 includes a base 4a' which is a portion of the section 4a of the housing portion 5a (the latter further includes a section 6a), and a disc-shaped or washer-like insert 46 which is preferably exchangeable so that it can be replaced with an insert having a different diameter d1, i.e., a different radius r1. The diameter d2 of the circular surface 47 of the base or portion 4a' of the section 4a is smaller than the diameter of the supporting surface 40 of the illustrated insert 46. The supporting surface 40 is part of the respective side 45 of the insert 46, i.e., of that side of the insert which contacts the adjacent side of the central portion 39 of the valving element In the fluid-operated valve 22a of FIG. 3, the diameter of the side 45 is the same as that of the supporting surface 40. The radius r1 of the surface 40 is selected in accordance with the aforediscussed considerations to thus ensure long intervals of retention of the valve 22a in open position and short closing times for the marginal portion 34 of the element 24. This is achieved by selecting the radius r1 as a function of one or more parameters including the diameter D, the thickness a and the Shore hardness of the material of the valving element 24 and by further ensuring the establishment of the aforediscussed relationship between the resonance frequency of the valving element 24 and the RPM of the drive which causes reciprocation of median portion of the diaphragm.

It is within the purview of the invention to replace a support having a circular supporting surface 40 with a support having a substantially oval supporting surface. A circular supporting surface 40 is preferred at this time because the support for the valving element 24 can be shaped and finished at a lower cost.

An advantage of the feature that the diameter d1 of the insert 46 is greater than the diameter d2 of the surface 47 on the portion 4a' of the section 4a is that this renders it possible to increase the number of differently dimensioned inserts which can be used in the valve 22a of FIG. 3 because the set of exchangeable inserts can include an insert having a diameter as small as d2 and an insert having a diameter exceeding d1 to thus enhance the resistance of the valving element 24 to movement of its marginal portion 34 away from sealing engagement with the seat 25. The insert 46 brings about the additional advantage that it enables a person having access to a set of inserts with different diameters to rapidly change the duration of opening times of the valve 22a, the duration of movement of the marginal portion 34 into sealing engagement with the seat 25, and hence the volumetric efficiency of the pump without necessitating any, even minor changes of the diameter d2 of the portion 4a' of the section 4a.

If desired or necessary, the diameters of various inserts 46 of a set of substantially disc-shaped or washer-like circular or substantially circular inserts can be ascertained empirically for a variety of different volumetric efficiencies of a diaphragm pump or another fluid flow machine employing one or more fluid-operated valves. The same applies for the selection of the diameter d2 of the surface 47 on the portion 4a' of the section 4a.

Figure 4:
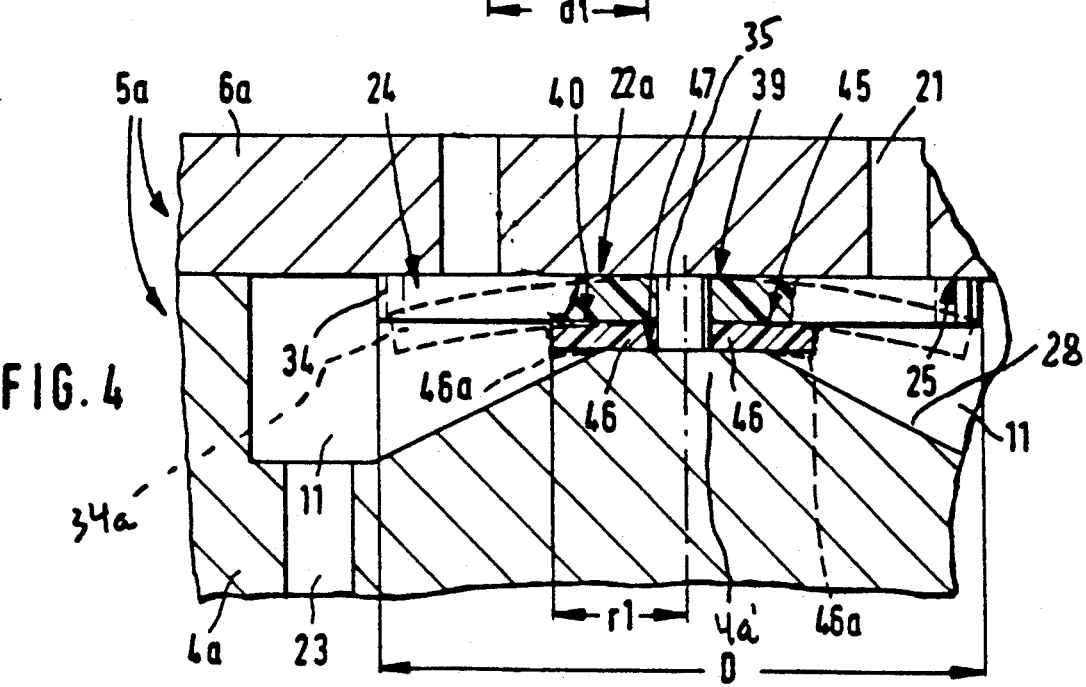
FIG. 4 is a similar sectional view of a valve which constitutes a modification of the valve of FIG. 3.

In accordance with a further feature of the invention, and as shown in FIG. 4, the preferably circular insert 46 can be made of a resilient material so that it yields when the fluid acts upon the valving element 24 in a direction to move the marginal portion 34 away from the seat 25. As shown in FIG. 4 by broken lines, the marginal portion 34 has been moved away from the seat 25 to the position 34a so that the valve 22a is partly open but the marginal portion merely extends into the adjacent portion of the compartment 11 without actually contacting the frustoconical surface 28 of the section 4a around the portion 4a'. The slightly deformed position of the insert 46 is shown by broken lines, as at 46a. The resilient insert 46 of FIG. 4 promotes rapid closing of the valve 22a because it biases the valving element 24 (and hence the marginal portion 34 of this valving element) toward the seat 25. The maker of the valve 22a which embodies the structure of FIG. 4 can influence the closing time of the valving element 24 by appropriate selection of the resiliency of the insert 46, of the resiliency of the valving element 24 and/or of the dimensions of the supporting surface 40 and/or the surface 47.

An insert 46 which can undergo at least some deformation in the region of its marginal portion contributes to more rapid opening of the valve in that the insert offers a less pronounced resistance to movement of the valving element away from the seat 25, either all the way against the frustoconical surface 28' in the compartment 11 or to an intermediate position such as that shown at 34a in FIG. 4. Moreover, the just outlined construction contributes to more rapid movement of the marginal portion 34 of the valving element 24 to its sealing position of engagement with the seat 25. A movement of the valving element to a fully open position in which the marginal portion 34 does not actually strike the frustoconical surface 28 is often desirable and advantageous because this results in a reduction of noise when the machine is in actual use, i.e., when the median portion of the diaphragm 3 performs alternating suction and expulsion strokes at a high or relatively high frequency. Still further, this reduces the wear upon the valving element 24 and upon the surface 28 (i.e., the portion 4a' of the section 4a) because the marginal portion 34 of the valving element does not actually contact the surface 28.

FIG. 2 shows a pin 35 which serves to center the portion 39 of the valving element 24 on the supporting surface 40. The axial length of that portion of the pin 35 which extends beyond the supporting surface 40 can equal or approximate the thickness a of the valving element 24.

The length of that portion of the pin 35 which extends beyond the surface 47 in the valve 22a of FIGS. 3 and 4 is selected in such a way that it matches or approximates the combined thickness of the valving element 24 and insert 46. This pin serves to center the valving element 24 as well as the insert 46 relative to the surface 47 of the portion 4a' as well as to center the valving element 24 and the insert 46 relative to each other.

The pin 35 which is shown in FIG. 2, 3 or 4 can be replaced with a rivet or with the shank of a bolt or screw without departing from the spirit of the invention. All that counts is to provide a suitable device which can accurately center the valving element 24 relative to its support and can accurately center the insert 46 relative to the portion 4a' and/or relative to the valving element.

The opening and closing times for the valving element 24 can be improved still further by designing the valve 22 or 22a in such a way that the flexibility or deformability of the valving element increases in a direction from its central portion 39 toward its marginal portion 34. This is automatically achieved by selecting the configuration of the compartment 11 in a manner as shown in FIGS. 2 to 4, i.e., by providing the section 4 or the portion 4a' of the section 4a with a frustoconical surface 28 which bounds one side of the compartment 11 and is adjacent and surrounds the surface 40 (FIG. 2) or the surface 47 (FIGS. 3 and 4). The magnitude of the angle h between the surfaces 26 and 28 determines the extent of movability of the marginal portion 34 away from the seat 25.

FIG. 5 illustrates a further fluid-operated valve 22 which differs from the valve 22 of FIG. 1 and from the valve 22a of FIGS. 2–3 in that the surface 28' bounding one side of the annular compartment 11 is a convex surface preferably forming part of a spherical surface to facilitate the shaping and machining and to thus reduce the cost of the valve and of the entire pump. The convex surface 28' merges gradually into the radially outermost portion of the supporting surface 40 on the section 4b of the portion 5b of the pump housing in which the valve of FIG. 5 is put to use. The portion 5b further includes a second section 6b. The resiliency of the valving element 24 is preferably such that the latter can assume the deformed or fully open position 24' which is indicted by dot-dash lines and in which one side of the valving element 24 hugs the convex surface 28'. The just discussed feature can be embodied with similar advantage in the embodiment of FIG. 3 or 4, i.e., in a valve wherein the valving element 24 is mounted on a composite support including an insert 46. The only difference would be that an intermediate portion of the underside of the valving element 24 (as viewed in FIG. 3 or 4) could not come into contact with the convex surface 28' due to the presence of the insert 46. All other conditions being the same, the feature of FIG. 5 can be incorporated in a valve 22, 22a or 122 in order to further shorten the intervals of movement of the valving element 24 to open or closed position and/or to lengthen the intervals of maintaining the valving element 24 in open position. The provision of an annular compartment 11, one side of which is bounded by a convex surface (such as the surface 28' shown in FIG. 5), in a valve wherein the support for the valving element 24 includes an insert 46 is particularly advantageous if the insert exhibits at least some resiliency as shown in and as described with reference to FIG. 4. The extent of flexing of the valving element 24 at the supporting surface 40 of the insert 46 is then dependent upon the resiliency of the insert. Thus, the curvature of the valving element 24 in fully open position of the respective valve will depend in part upon the resiliency of the insert 46 and in part on the curvature of the surface 28'. Alternatively, the curvature of the convex surface 28' will be caused to conform to the curvature of the confronting side of the valving element 24 in the selected fully open position of the valve. The arrangement is preferably such that, while undergoing deformation during movement toward the fully open position, the valving element 24 actually rolls along the surface 40 of the insert 46 and along the convex surface 28' or along the surface 40 of the section 4 or 4b and the convex surface 28'.

An additional advantage of the convex surface 28' is that the mass of moving parts of the valve is reduced, that the movements of the valving element 24 between its open and closing positions produce even less noise, and that the wear upon the valving element 24 and upon the adjacent parts is even less than in the embodiments of FIGS. 2 to 4.

The reference character b denotes in FIG. 5 the maximum distance of the marginal portion 34 (in sealing position of the valving element 24) from the convex surface 28' at one side of the annular compartment 11. The valving element 24 can be flexed all the way from the supporting surface 40 of the portion 4b' to the marginal portion 34, and the flexing is completed (the element 24 then assumes the position 24') when the marginal portion 34 reaches and abuts the convex surface 28'. As already mentioned above, the utilization of a section 4b with a convex surface 28, renders it possible to ensure full surface-to-surface contact between the section 4b and the valving element 24 when the latter assumes the position 24'0 and this, in turn, further reduces the intervals of time which are required to move the marginal portion 34 between the sealing position (abutment against the seat 25) and the fully open position (abutment against the convex surface 28'), it being assumed that all other aforediscussed parameters remain the same. The directions of movement of the marginal portion 34 of the valving element 24 in the valve 22 of FIG. 5 between its two extreme position are indicated by a double-headed arrow 30. Since the underside of the valving element 24 is caused to "roll" along the convex surface 28', the movements of the valving element to the fully open position generate little noise (because the marginal portion 34 is not caused to abruptly strike the surface 28' when it assumes the position 34'). Of course, the generation of any appreciable noise in response to movement of the valving element 24 from the sealing position of engagement with the seat 25 is even less likely if the marginal portion 34 is not caused to move all the way into contact with the convex surface 28' in the annular compartment 11. If the surface 28' is part of a spherical surface, at least the major part of the valving element 24 closely hugs such convex surface in the position 24' of FIG. 5 so that the deformed element 24 constitutes or resembles a portion of a hollow sphere. The utilization of a circular or substantially circular valving element 24 exhibits the additional advantage that the (unnecessarily) moving mass during opening or closing of the valve 22 is reduced to a minimum.

The valving element 24 is preferably mounted in stressed condition so that it tends to move into sealing engagement with the seat 25. A presently preferred material for the valving element 24 is a plastic substance known as neoprene It is also possible to employ a plastic material known as VITON (Trademark), especially if the material of the valving element 24 should be capable of exhibiting a pronounced resistance to corrosive effects of the conveyed fluids. The difference between the Shore hardness of neoprene and the Shore hardness of VITON (Trademark) can be compensated for by utilizing a suitably dimensioned (diameter d) insert 46 of a material exhibiting a satisfactory resiliency and/or by appropriate selection of the thickness a and/or the diameter D of the valving element 24; this ensures that the valving element will be acted upon with a desired closing force.

The valve 122 of FIG. 1 can be identical with the valve 22 of FIGS. 1-2, with the valve 22a of FIG. 3, with the valve 22a of FIG. 4 or with the valve 22 of FIG. 5. The only difference between these valves is that the annular compartment 11a for the valving element 24a of the valve 122 is provided in the section 6 because the valving element 24a moves away from its seat 25a when the diaphragm 3 is in the process of expelling fluid from the chamber 13 into the bore 20a, i.e., the fluid must flow first through the channels 23a, thereupon through the compartment 11a and then into and through the channels 21a. The support for the valving element 24a of the valve 122 can include an insert 46 regardless of whether or not the support for the valving element 24 of the valve 22 comprises an identical or a larger or smaller insert, i.e., an insert having a larger or smaller diameter d1 and exhibiting the same or a different resiliency.

The feature that the valving element 24 can actually roll along the convex surface 28' during movement toward the position 24' renders it possible to considerably reduce the mass of the moving part of the valving element and to thus enable the valving element to complete its movement between the two end positions within a short interval of time. This, in turn, enhances the volumetric efficiency of the pump. The mass of the moving part of the valving element 24 will be selected in dependency on the required rate of fluid flow through the valve 22, i.e., in dependency on the desired quantity of fluid which is to be conveyed per unit of time. The arrangement of FIG. 5 exhibits the additional advantage that it eliminates, or at least greatly reduces, the likelihood of vibration of component parts of the valve and the likelihood of abrupt impact of the marginal portion 34 of the valving element upon the convex surface 28'. Therefore, the operation of a fluid-operated valve which embodies the features of FIG. 5 is quieter and the mechanical stressing of its parts is less pronounced. Under certain circumstances, the interval of time which is required to move the valving element 24 between its fully open and fully closed or sealing positions can be greatly reduced to thus contribute to the volumetric efficiency of the pump. The advantages of the convex surface 28' are particularly pronounced if the supporting surface 40 is provided on the section 4b, i.e., if the radially innermost portion of the convex surface 28' can gradually merge directly in the supporting surface 40.

This contributes to more satisfactory rolling of the flexible part of the valving element 24 from the solid-line position to the position 24' of FIG. 5. When the movement of the valving element 24 to the position 24' of FIG. 5 is completed, the entire underside of the thus deformed valving element lies flush against a composite surface of the section 4b, namely against the supporting surface 40 and the convex surface 28'. However, similar results can be achieved also if the support for the central portion 39 of the valving element 24 does include an insert 46 and the insert is resilient so that it can be deformed in a manner as shown in and described with reference to FIG. 4. Thus, the advantage of rolling or substantial rolling of one side of the valving element 24 along the surface which surrounds the supporting surface 40 can be achieved irrespective of whether the support for the central portion 39 is of one piece or includes a preferably exchangeable insert 46. Such rolling brings about a reduction of noise and a reduction of wear upon the valving element and the adjacent parts.

Figure 6:
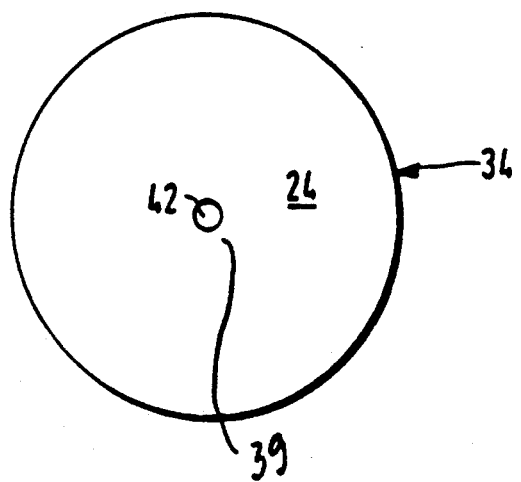
FIG. 6 is a plan view of a valving element which can be utilized in the valve of FIGS. 2, 3, 4 or 5.

FIG. 6 shows a presently preferred valving element 24 having a marginal portion 34 engageable with a seat 25 (not shown in FIG. 6) and a central opening 42 for the pin 35 or an analogous centering device. The valving element 24 of FIG. 6 is assumed to be flat, i.e., it is assumed to be maintained in a position corresponding to that of the element 24 which is shown in FIG. 5 by solid lines. The view of FIG. 6 is taken in the direction of arrow A which is shown in FIG. 5.

The features of the valves which are shown in FIGS. 2, 3, 4 and 5 can be utilized individually or in any proper combination with each other, depending on the nature of the machine which embodies one or more fluid-operated valves of the above outlined character as well as on the desired volumetric efficiency of the machine. For example, the mass of the valving element 24 or 24a can be selected in dependency on the RPM of the drive 108 for the connecting rod 7, and this feature can be resorted to in addition to any of the aforediscussed features of the improved fluid-operated valve, such as the utilization of a convex surface 28', the utilization of a set of inserts 46, the utilization of a valving element 24 or 24a which exhibits a particular resiliency, the utilization of a valving element having a particular diameter D, the utilization of a valving element having a particular thickness a, the utilization of a resilient or non-resilient insert 46 and/or the utilization of an insert having a smaller or a larger diameter d1. All or some of these undertakings can be combined in order to achieve a greater volumetric efficiency, to reduce the generation of noise and/or to reduce the wear upon the parts of the valve 22, 22a and/or 122.

The provision of an insert 46, and more particularly of a set of two or more interchangeable inserts, as a component part of the support for the central portion 39 of the valving element 24 constitutes a feature which is believed to be novel and patentable per se. The inserts 46 render it possible to select the diameter d1 of the supporting surface 40, and hence the volumetric efficiency of the improved pump, to best suit the requirements in a particular field of use. Moreover, the person in charge of selecting an optimal volumetric efficiency is in a position to test the operation of the pump with each of a set of two or more different inserts. Still further, the insert or inserts can be made of a material other than the material of the section 4a. For example, the person in charge may wish to reduce the likelihood of corrosion of the support for the valving element; this can be achieved by the simple expedient of replacing a neoprene insert with an insert which is made of VITON (Trademark). The differences in the characteristics of the two materials can be compensated for by appropriate selection of the diameter and/or thickness and/or resiliency of the selected insert. This ensures that the closing force upon the valving element 24 will remain the same regardless of whether the supporting surface 40 is provided on a neoprene insert or on an insert made of VITON (Trademark).

Experiments with the improved fluid-operated valves indicate that a machine which employs a valving element 24 or 24a can operate with a very high degree of accuracy and predictability. Therefore, the improved valve or valves can be incorporated with advantage in all kinds of pumps and like fluid flow machines including metering pumps for gaseous or even hydraulic fluids. Such high degree of accuracy cannot be achieved with machines which employ conventional fluid-operated valves because, in a conventional valve, the periods of dwell of valving elements in open positions are very short or nil, i.e., the movement toward open position is immediately followed by a movement back to the closed position. The improved valves render it possible to shorten the duration of movement of the marginal portion of the valving element to open or closed position to such an extent that the valving element can remain in the open position for a relatively long interval of time even if the median portion of the diaphragm 3 is reciprocated at a high frequency. The feature that the length of the interval of movement of the valving element between its closed or open positions in accordance with the aforediscussed features of the present invention is lengthened also contributes to predictability of the rate of delivery of a fluid and thus renders it possible to employ a pump using the improved valve or valves under circumstances (e.g., as a metering pump for gaseous or hydraulic fluid) which are not conducive to the use of a pump employing one or more conventional fluid-operated valving elements. All other parameters being equal, the operator or designer of the machine embodying the improved valving element or elements has at her or his disposal a further parameter which can be resorted to in order to enhance the volumetric efficiency of the machine by the simple expedient of selecting the diameter of the supporting surface 40 for the central portion 39 of the valving element in a manner such that the selected frequency of the diaphragm 3 or another piston induces a resonant frequency of the valving element. Thus, the operator can take into full consideration the desired pressure and the rate of flow of the conveyed fluid, such as a gaseous fluid. If the conveyed fluid is a hydraulic fluid, the aforediscussed feature of the improved fluid-operated valve will be selected by taking into consideration the rate of flow of hydraulic fluid during movement of a valving element to its open or sealing position The ability of the valving element to roll along the adjacent surface (namely along the surface which surrounds the supporting surface 40) during movement of the valving element toward open position contributes to the aforediscussed advantages and versatility of the improved fluid-operated valve or valves and of the machine in which such valve or valves are put to use.

A machine which embodies one or more fluid-operated valving elements 24 or 24a of the type shown in FIGS. 1 to 6 can be used as a suction or vacuum pump or as a compressor. Furthermore, and as already pointed out hereinbefore, the long opening times and rapid closing times for the valving element 24 or 24a (i.e., highly satisfactory volumetric efficiency) which can be achieved in accordance with the present invention render it possible to employ such fluid-operated valve or valves i metering pumps, even in metering pumps for hydraulic fluids.

Pumps which are somewhat similar to the pumps of the present invention are disclosed in commonly owned German patent application Ser. No. 41 18 651 A1 published Aug. 6, 992.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A fluid flow machine comprising a housing defining a chamber; a piston movable relative to said housing to alternatively perform first and second strokes at a selected frequency and to thereby respectively draw fluid into and expel fluid from said chamber; a fluid-operated first valve arrived by said housing to admit fluid into said chamber when said piston performs a first stroke; and a fluid-operated second valve carried by said housing to discharge fluid from said chamber when said piston performs a second stroke, at least one of said valves comprising a substantially disc-shaped resilient valving element having a predetermined thickness and a predetermined diameter, a central portion and a marginal portion, a seat for said margin portion at one side of said valving element and a support for said central portion at the other side of said valving element, said marginal portion being moved away from said seat by the fluid whenever said piston performs one of said first and second strokes and said at least one valving having a compartment surrounding said support to receive said marginal portion when the marginal portion moves away from said seat, said support having a substantially circular first surface which contacts said central portion and having a radius such that said selected frequency of said piston induces a resonant frequency in said valving element.

2. The machine of claim 1, wherein said radius is a function of at least one of the diameter, the thickness and the resiliency of said valving element.

3. The machine of claim 1, wherein resiliency of said valving element increases in a direction from said central portion toward said marginal portion.

4. The machine of claim 1, wherein at least a portion of said first surface is flat.

5. The machine of claim 1, wherein said housing includes a portion adjacent one side of said chamber and said valves are provided in said portion of said housing.

6. The machine of claim 1, wherein the other of said valves is at least substantially identical with said at least one valve.

7. The machine of claim 1, wherein at least a portion of said other side of said valving element is flat when said marginal portion engages said seat.

8. The machine of claim 7, wherein said portion of said other side is provided on said central portion.

9. The machine of claim 1, wherein said support includes a base having a second substantially circular surface, and a substantially disc-shaped insert between said base and said other side of said valving element, said second surface having a radius smaller than the radius of said first surface which contacts the central portion of said valving element, said inset being connected to said base.

10. The machine of claim 9, wherein said base forms part of said housing.

11. The machine of claim 1, wherein said support comprises a base and an exchangeable insert connected to said base, said first surface being provided on said insert.

12. The machine of claim 11, wherein said base forms part of said housing.

13. The machine of claim 11, wherein said insert includes a resilient disc.

14. The machine of claim 13, wherein said resilient disc has a marginal portion which yields under the action of said valving element when the marginal portion of the valving element is acted upon by said fluid to move away from said seat and into said compartment.

15. The machine of claim 1, wherein said support has an at least partially arcuate second, surface which surrounds said substantially circular first surface and bounds a portion of said compartment.

16. The machine of claim 15, wherein said second surface is at least partially convex and merges gradually into said substantially circular first surface.

17. The machine of claim 16, wherein said marginal portion of said valving element is movable in said compartment into abutment with said second surface.

18. The machine of claim 17, wherein said valving element is flexible to lie at least substantially flush against said second surface in response to movement of said marginal portion away from said seat.

* * * * *